Aug. 8, 1933.  I. L. CHAMBERS  1,921,023

FLUID MOTOR

Filed April 25, 1931   3 Sheets-Sheet 1

INVENTOR
Ira L. Chambers
BY
ATTORNEY

Aug. 8, 1933.   I. L. CHAMBERS   1,921,023
FLUID MOTOR
Filed April 25, 1931   3 Sheets-Sheet 2
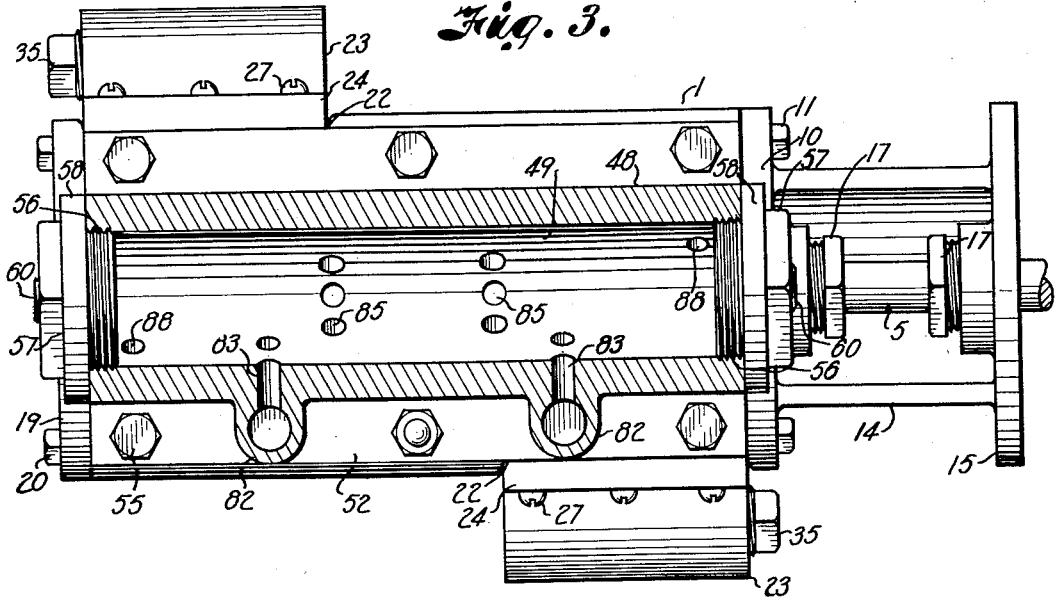
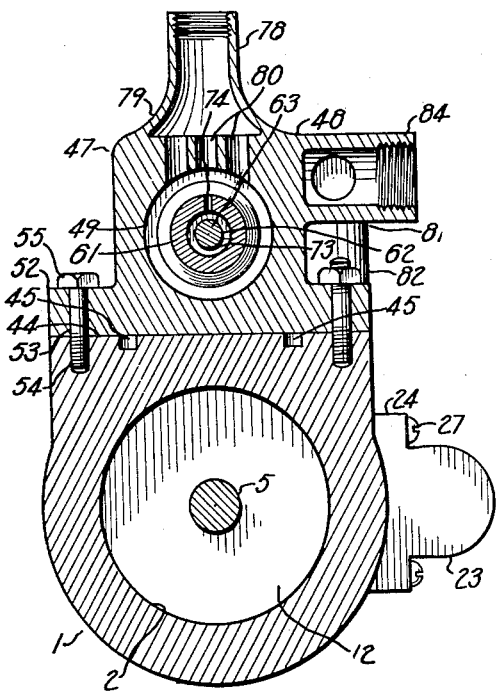
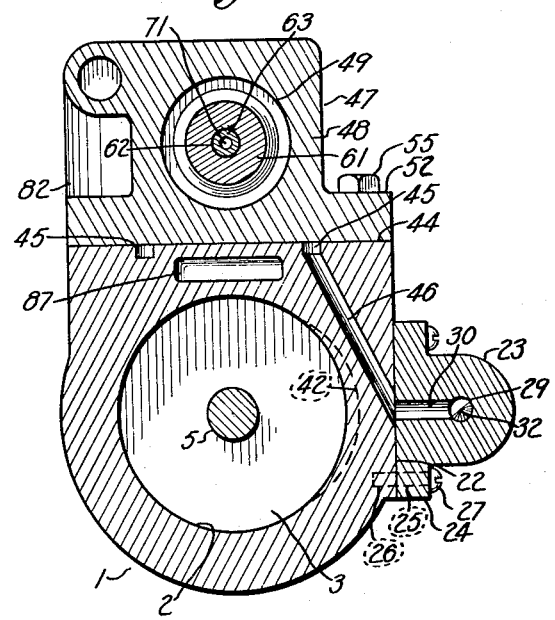
INVENTOR
Ira L. Chambers
BY
ATTORNEY Aug. 8, 1933.    I. L. CHAMBERS    1,921,023
FLUID MOTOR
Filed April 25, 1931    3 Sheets-Sheet 3
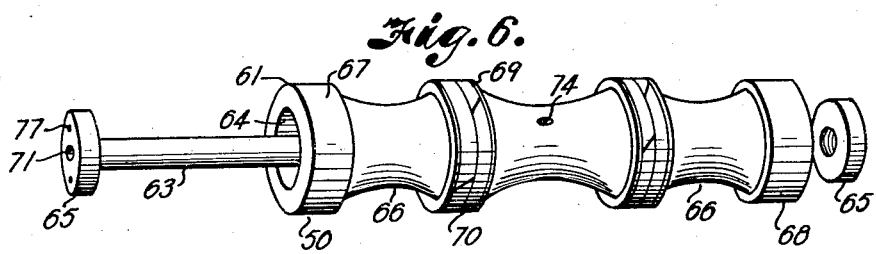
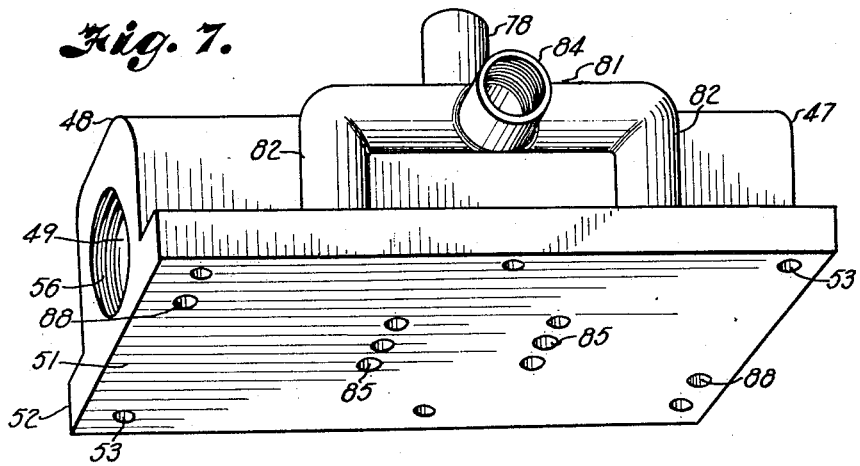
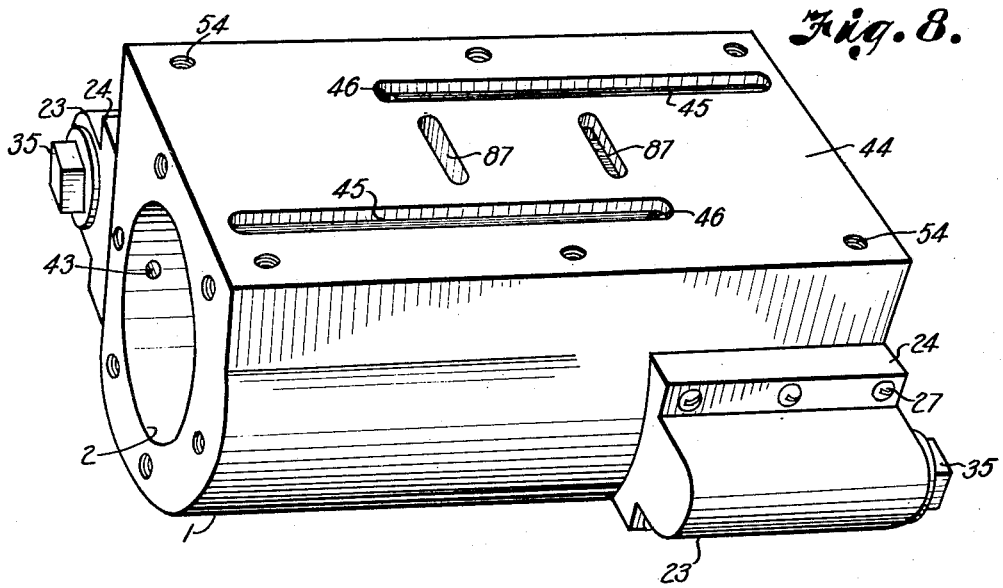
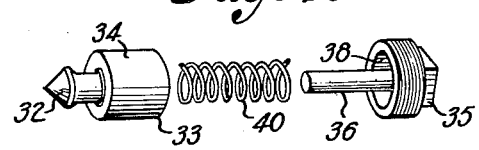
INVENTOR
Ira L. Chambers
BY
ATTORNEY Patented Aug. 8, 1933

1,921,023

UNITED STATES PATENT OFFICE 1,921,023

FLUID MOTOR

Ira L. Chambers, Enid, Okla., assignor of one-half to George E. Failing, Enid, Okla.

Application April 25, 1931. Serial No. 532,764

2 Claims. (Cl. 121—158)

My invention relates to fluid motors and more particularly to the steam ends of steam pumps, the present invention being designed to be also actuated by gas, oil or water pressure, and is applicable for supplying power to operate practically any other mechanism for which motive power is required.

The principal object of my invention is to provide an apparatus of this character wherein the valve mechanism for effecting a reversal of flow of pressure medium to opposite ends of the power cylinder is automatically operated by the pressure medium thereby eliminating the use of rockshafts, valve rods and levers such as are commonly employed for mechanically actuating the valves.

Another object of the invention is to provide an apparatus wherein the ends of the several members may be reversed in their relative positions without interfering with the proper operation of the motor so that skill and extra precaution will not be required for assembling the mechanism.

A further object of the invention is to embody improved means for sealing the travel of the piston rod through the head of the cylinder.

In accomplishing these and other objects of my invention I have provided improved details of structure the preferred form of which is illustrated in the accompanying drawings, wherein:

Fig. 3 is a plan view of the motor, the slide valve housing being shown in central horizontal section.

Fig. 4 is a cross section on the line 4—4, Fig. 1, showing, particularly, the inlet ports for the pressure medium.

Fig. 5 is a cross section on the line 5—5, Fig. 2, illustrating the arrangement of channels in the power cylinder.

Fig. 6 is a detail perspective view of the cylindrical slide valve.

Fig. 7 is a perspective view of the valve housing.

Fig. 8 is a complementary perspective view of the power cylinder showing the relation of its fluid passages to those provided in the valve housing.

Fig. 9 is a perspective view of by-pass valve members in disassembled relation.

Figure 1:
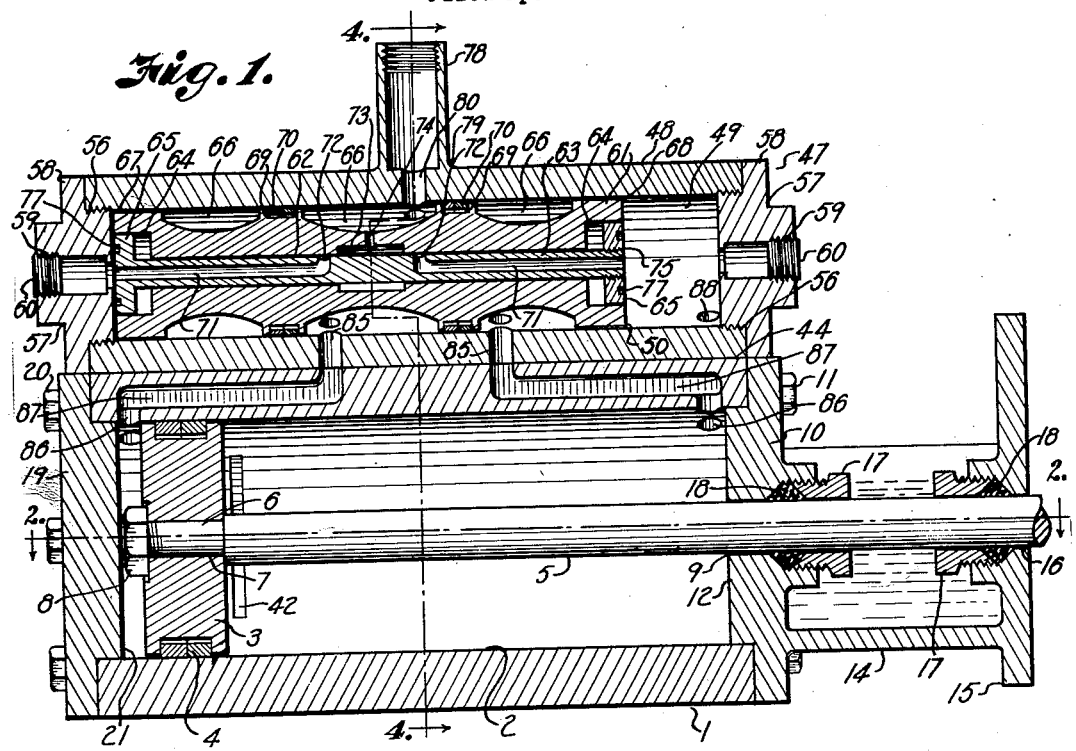
Fig. 1 is a central longitudinal section of the motor in assembled condition.

Referring more in detail to the drawings:

1 designates a power cylinder having an inner wall 2 for slidably receiving a piston 3 provided with the usual sealing rings 4.

A piston rod 5 having a reduced inner end 6, extended through a concentric opening 7 of the piston, is secured to the piston by a nut 8 threaded on the outer end of the reduced portion and the opposite end of the rod slidably extends through the concentric opening 9 of a closure plate 10 secured to one end of the cylinder by bolts 11 and having a reduced concentric boss 12 seated in the cylinder.

An integral U-shaped trough 14 is formed on the outer face of the closure plate and is joined to a spaced bracket 15 adapted to be secured to the water end of a steam pump and having an opening 16 aligning with the opening 9 for receiving the piston rod. Each of the openings 9 and 16 are counterbored and internally threaded to receive packing glands 17 for urging packing material 18 into sealing engagement with the rod, and the trough member is of sufficient depth to retain enough lubricant therein for covering the rod to additionally seal its travel through the closure plate. The opposite end of the cylinder is closed by an end plate 19 secured thereto by bolts 20 and having a reduced concentric boss 21 extending into the cylinder.

Mounted on a flattened portion 22 provided on each side of the cylinder adjacent its ends is a by-pass valve housing 23 having side flanges 24 provided with openings 25 aligning with threaded openings 26 in the cylinder for receiving screws 27 to secure the valve housings to the cylinder.

Each of the by-pass housings includes a cylindrical opening 28 terminating in a constricted bore 29 communicating through a lateral port 30 with the power cylinder for a purpose presently described.

A radial annular shoulder 31 formed by the constricted bore 29 serves as a seat for the conical end 32 of a by-pass valve 33 including a cylindrical guide portion 34 slidably engaging the opening 28 of the by-pass housing. The outer end of the opening is internally threaded for receiving a plug screw 35 provided with a concentric guide stem 36 threaded therein, as shown at 37.

Seated in a socket 38 of the plug screw and in a similar socket 39 provided in the guide portion of the by-pass valve is a spring 40 for normally urging the by-pass valve against its seat, and a transverse port 41 communicating the enlarged opening 28 with an arcuate recess 42 in the cylinder wall 2 serves to permit passage of pressure medium from the power cylinder to the by-pass valve to raise the valve from its seat against the tension of the spring 40.

Figure 2:
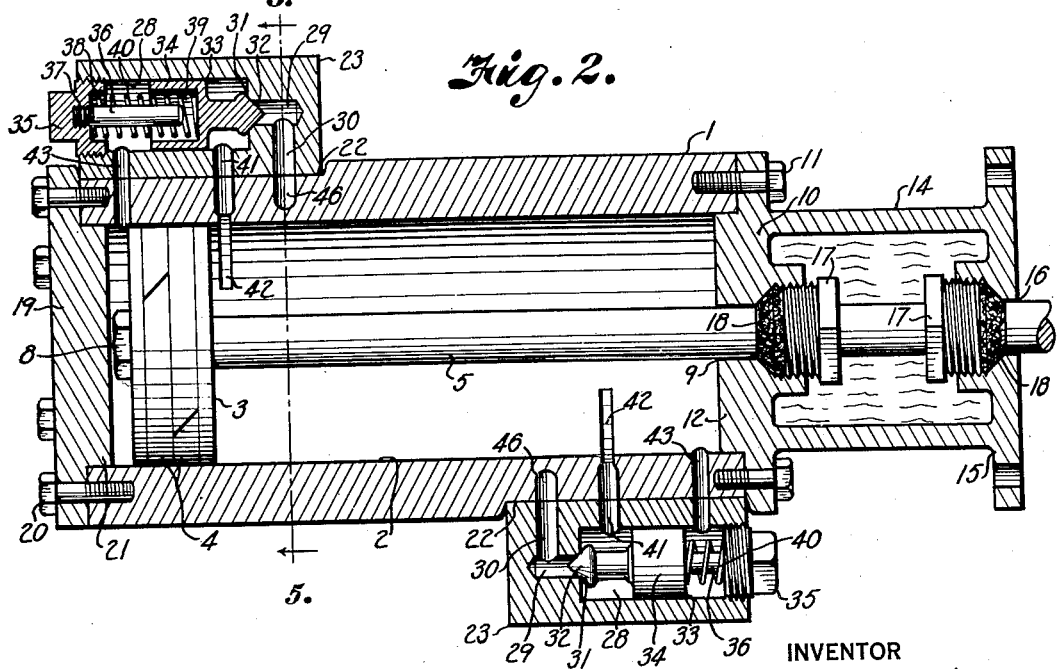
Fig. 2 is a horizontal section on the line 2—2, Fig. 1, showing, particularly, the power cylinder and by-pass valves.

Another transverse port 43, preferably smaller in diameter than the port 41, communicates the opposite end of the enlarged bore with the power cylinder so that when the piston is traveling toward the opposite end of the cylinder from that shown in Fig. 2 the pressure medium will also enter through the port 43 and assist the spring 40 to maintain the by-pass valve in seated condition.

The upper side of the power cylinder comprises a plane surface 44 having parallel grooves 45 adjacent its longitudinal edges, the grooves extending from opposite ends of the power cylinder throughout approximately two-thirds of the length of the cylinder. Their inner ends are connected by oblique ports 46 to the ports 30 of the by-pass valve housing for a purpose later to be described.

In order to effect reciprocating movement of the power piston in its cylinder an automatically actuated valve mechanism 47 is provided including a slide valve housing 48 having a longitudinal cylindrical bore 49 for receiving a cylindrical slide valve 50 to control inlet and outlet of pressure medium to and from the power cylinder.

The slide valve housing is also provided with a plane lower face 51 for snugly seating on the upper face of the power cylinder and outwardly directed side flanges 52 of the valve housing are provided with openings 53 aligning with threaded openings 54 in the power cylinder to receive cap screws 55 for securing the slide valve housing to the power cylinder. The ends of the slide valve housing are internally threaded, as shown at 56, for receiving end heads 57 having outwardly extending flanges 58 seating on the ends of the valve housing, and concentric openings 59 in the closure members are normally closed by plugs 60 so that, by removing the plugs, the slide valve may be manually moved in the bore 48, if necessary, by inserting a rod through the opening 59.

The slide valve unit includes a primary valve 61 provided with a concentric longitudinal bore 62 for slidably receiving a secondary valve 63, the outer ends of the bore being enlarged, as shown at 64, for receiving enlarged heads 65 formed on the ends of the secondary valve.

Spaced annular recesses 66 formed in the primary valve produce radial end and intermediate flanges 67 and 68 respectively, the end flanges being of slightly less diameter than the intermediate flanges and grooves 69 being formed in the intermediate flanges for receiving rings 70 to seal the sliding movement of the valve unit in its cylinder.

As particularly shown in Fig. 1 of the drawings, the counterbored portion 64 of the primary valve is of sufficiently greater width than the heads of the secondary valve to permit a limited sliding movement of the secondary valve within the primary valve, and longitudinal concentric channels 71 in the secondary valve terminate in side outlets 72 near the center of the primary valve and adjacent an enlarged chamber 73 formed in the primary valve and communicate by a port 74 with the central annular recess 66.

It will be clear from Fig. 1 that maximum movement of the secondary valve in the primary valve will communicate one of the channels 71 with the enlarged chamber 73, but, when in neutral position, both channels will be out of communication with the center or inlet chamber of the slide valve housing.

To provide for assembling the primary and secondary valves, one end of the primary valve may be threaded, as shown at 75, for engaging the internal threads of the cooperating head member 65 provided with sockets 77, or the like, wherein a suitable tool may be inserted for threading the head on the stem.

The inlet for the slide valve housing comprises, preferably, a cylindrical pipe section 78 having an outwardly flaring lower end 79 secured to the valve housing by means such as welding, the reason for flaring the mouth being to communicate the inlet with a plurality of ports 80 extending transversely through the upper wall of the valve housing for conducting steam or other pressure medium to the inlet chamber defined by the central annular recess 66 of the valve unit.

The exhaust outlet of the valve housing comprises a manifold 81 having spaced branches 82 communicating by ports 83 with the interior of the valve chamber or exhaust chambers defined by the outer of the annular recesses 66, and a single branch 84, centrally secured to the manifold, may be connected to any suitable conduit desired for leading the exhaust from the motor.

Means for conducting fluid pressure from the valve housing to the power cylinder and for conveying the exhaust from the power cylinder back into the valve chamber includes ports 85 provided in the lower wall of the valve housing and connected with ports 86, opening into the power cylinder adjacent its ends by longitudinal channels 87, and the extreme outer ends of the grooves 45 provided in the upper face of the power cylinder are connected with the valve housing by ports 88 extending through the lower wall of the slide valve housing.

The inlet and outlet ports of the valve housing and also of the power cylinder are formed in radial series to permit passage of the sealing rings over the ports without interference.

With a motor constructed and assembled as described, the operation would be as follows:

In Fig. 1 of the drawings, the valve unit is in a position to permit passage of fluid pressure medium to the left-hand end of the power cylinder to force the piston to the opposite end of the cylinder.

From Fig. 2 it will be seen that, as soon as the piston has almost reached its opposite limit of travel, the port 41 to the by-pass valve adjacent this end will be uncovered and steam will enter into the by-pass valve chamber to move the valve from its seat permitting passage of a portion of the steam through the ports 29 and 30 and oblique port 46 into the groove 45 in the upper face of the power cylinder from whence it is led to the port 88 adjacent the opposite end of the valve housing.

The entrance of steam into this end of the valve housing will first slide the secondary valve to its limit of movement in the primary valve, thereby bringing the left channel 71 of the secondary valve into communication with the inlet chamber 73 of the primary valve, so that additional steam passing through the port 74 and channel 71 will be admitted to the left end of the primary valve to slide the entire valve unit to the right end of the valve housing, it being apparent that, upon contact of the secondary valve with the right end closure of the valve housing, the movement of the secondary valve will terminate, but the primary valve will continue to move until it also engages this end closure.

As a result, the longitudinal ports of the secondary valve will be again brought out of communication with the inlet chamber of the primary valve and this new position of the slide valve unit will direct in-coming steam through the right channel 87 to return the piston to the left-hand end of the cylinder, and exhaust steam remaining in the cylinder will be forced through the left channel 87 into the exhaust manifold.

In this manner the operation of the pump will continue and the actuation of the silde valve will automatically control the movement of the piston, and the piston in turn will control movement of the slide valve without any mechanical connection.

Pressure medium remaining in the slide valve housing will serve to cushion the reciprocating movement of the slide valve unit, but due to the decreased diameter of the outer flanges of the primary valve this exhaust pressure medium will slowly leak past the flanges into the exhaust chamber from where it is free to pass from the valve housing through the exhaust manifold.

While my invention has been described, particularly, as a steam end for a steam pump, it will be obvious that this device will serve also as a motor for operating other mechanical contrivances, and that any suitable pressure medium may be employed for actuating the motor.

What I claim and desire to secure by Letters Patent is:

1. In a device of the character described, a power cylinder, a piston in the cylinder, a slide valve housing, a valve unit in the housing including a primary valve having spaced annular flanges to define a central inlet chamber and end exhaust chambers, and having a longitudinal bore and an inlet port connecting said bore with the inlet chamber, said valve having end recesses, a secondary valve slidably mounted in said bore having longitudinal channels extending into opposite ends thereof adapted to selectively communicate with said port, heads on the secondary valve adapted to seat in said recesses to limit sliding movement of the secondary valve, and conduits connecting the ends of the power cylinder inversely with the ends of the valve housing for directing fluid pressure to opposite ends of the valve unit for sliding the secondary valve to communicate one of said channels with said port for moving the primary valve.

2. In a device of the character described, a power cylinder, a piston in the cylinder, a slide valve housing having a cylindrical bore closed at its ends, a valve unit including a primary valve of less length than the bore slidably mounted in the bore and having end and intermediate flanges to define a central inlet chamber and end exhaust chambers, and having an axial bore and an inlet port connecting said bore with the inlet chamber, the end flanges being spaced peripherally from the slide valve housing to slowly by-pass a pressure medium confined in the ends of the valve housing for cushioning endwise movements of the primary valve, a secondary valve slidably mounted in the bore of the primary valve and having longitudinal channels extending into opposite ends thereof adapted to selectively communicate with said port, conduits connecting the ends of the power cylinder inversely with the ends of the valve housing for directing fluid pressure to opposite ends of the valve unit for sliding the secondary valve to communicate one of said channels with said port for moving the primary valve, and means for returning said secondary valve to neutral position in relation to the primary valve.

IRA L. CHAMBERS.